H. G. BULKLEY.
Evaporating Pan.

No. 11,207.

Patented July 4, 1854.

UNITED STATES PATENT OFFICE.

HENRY G. BULKLEY, OF KALAMAZOO, MICHIGAN.

IMPROVEMENT IN THE CONSTRUCTION OF SALT-EVAPORATORS.

Specification forming part of Letters Patent No. 11,207, dated July 4, 1854.

*To all whom it may concern:*

Be it known that I, HENRY G. BULKLEY, of Kalamazoo, in the county of Kalamazoo and State of Michigan, have invented certain new and useful improvements in evaporating-pans to be employed in the process of boiling salt and in other operations of similar character; and I do hereby declare that the following is a full, clear, and exact description of the same, reference being had to the accompanying drawings, forming part of this specification, in which—

Figure 1:
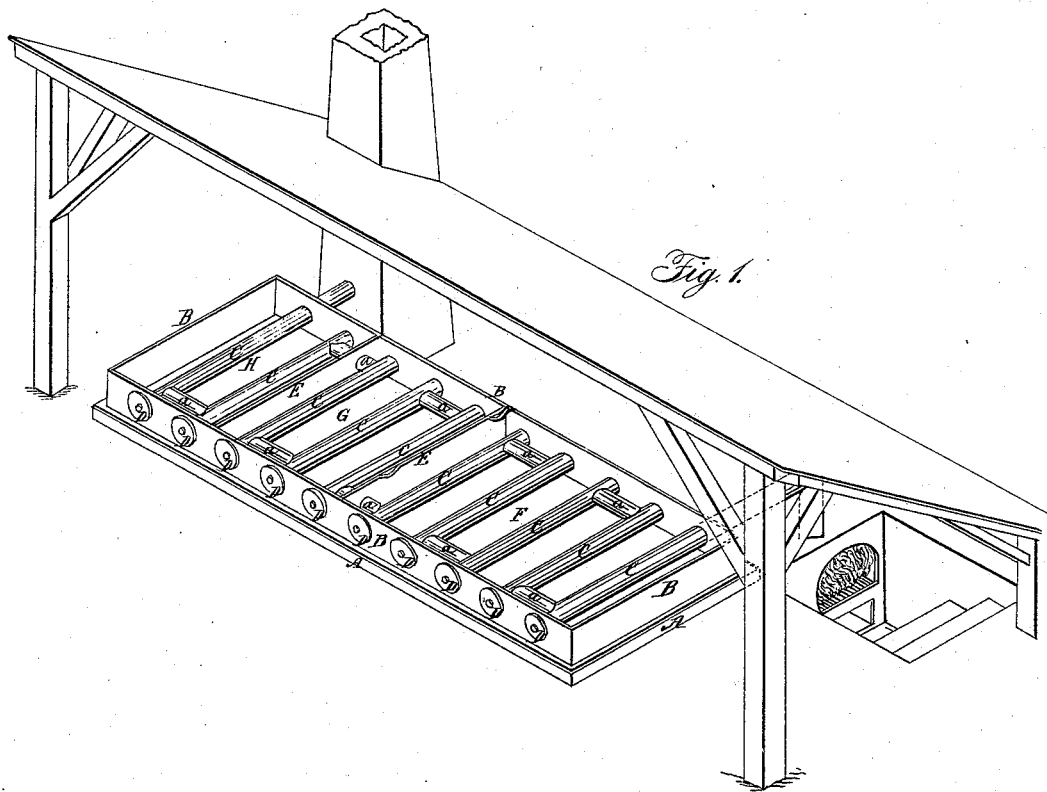
Figure 2:
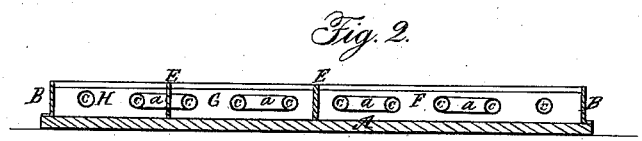

Figure 1 is a perspective view of an evaporating-pan constructed according to my invention. Fig. 2 is a longitudinal section of the same.

Similar letters of reference indicate corresponding parts in both figures.

The process of boiling salt is usually performed in a series of kettles set in two contiguous rows, with arches running the whole length of each row, and is attended with many difficulties, among which the following are the most important: The kettles receive different amounts of heat according to their position on the arch. After a kettle is filled with brine and heat applied, a portion of the impurities of the brine subside to the bottom and form a sediment which requires to be removed before the brine is boiled down to salt. Whatever method is adopted for the removal of this sediment, a portion is sure to remain and form an incrustation on the bottom kettle. This incrustation covering the heating-surface, in a short time retards the boiling process very materially, and at certain intervals requires to be removed by picking with iron or steel picks, the latter operation generally occupying one day in six. The accumlation of salt as the boiling process arrives near its termination also retards the boiling process very considerably. Sometimes the process is performed in large shallow flat-bottomed pans heated by fires beneath them, but is attended with nearly the same difficulties as when performed in kettles.

The object of my invention is to overcome the above difficulties.

My invention consists in an improvement in the arrangement of and manner of heating the the pans.

To enable those skilled in the art to make and use my invention, I will proceed to describe its construction and operation.

The most convenient method of carrying out my invention is to construct a single pan, and divide it into the necessary compartments, as represented in the accompanying drawings. The bottom A of the pan is made of planks put together in such a way as to be perfectly water-tight, and is in the form of a quadrangle whose width is equal to about three-eighths of its length. The sides B B are formed by nailing sheet-iron to the bottom. Metal pipes C C are arranged transversely in the pan, passing through the sides thereof, and having their ends closed with loose stoppers D D, which can be taken out for the purpose of cleaning the pipes. The pipes C C are connected inside the pan by short pipes $a$ $a$ in such a way as to form a continuous flue entering the pan at one end, passing circuituously through it, and leaving at the other end. This flue receives the whole of the heat from a furnace arranged near the pan. The pipes are arranged at a distance from the bottom of the pan, so as not to interfere with the deposit of salt on the bottom, but still so low as to be entirely covered with brine. A pan may be advantageously constructed of the following dimensions: length, thirty-two (32) feet; width, twelve (12) feet; depth, two (2) feet, having ten (10) pipes, C C, of one (1) foot diameter placed at equal distances apart, with their botttom parts at a distance of eight (8) inches from the bottom of the pan. The pan should be divided by transverse partitions E E' into three compartments or separate pans, the first partition being placed across the center of the pan, so as to cut off the first half where the flue enters, and form a distinct pan, F, containing five (5) pipes, C C, and the second partition being placed at a distance of nine (9) feet from the first, so as to divide the remaining half of the large pan into smaller pans, G H, the former containing three (3) and the latter two (2) heaters. The several compartments or separate pans may be provided with faucets or some other arrangement for communicating with each other to draw the contents from one to the other, or the communication may be by an overflow, as at $e$ $e'$. The brine is fed continuously by any suitable means to the pan H, where it is warmed by the flue to a sufficient degree to cause some of its impurities to subside. It flows from the upper part of F, where it is warmest and purest to the pan G, where its temperature is raised to the boiling point, and the remainder of its impurities subside. It then flows to the pan F, where it is boiled down to salt free from all impurities.

By conducting the boiling operation in an apparatus constructed as described, the following results are obtained: First, the separation of the impurities from the brine is effected previously to its entering the vessel in which the crystallization takes place, consequently a purer salt must be obtained; second, the accumulation of salt at the bottom of the pan does not retard the boiling process; third, in consequence of the flues or heating surfaces occupying the upper part of the brine, which is the hottest and weakest portion, the salt will not settle on them, and the bottom part of the pan is left cooler, and consequently in a state more favorable to the crystallization; fourth, no heat is lost, as what escapes after raising the temperature of the brine in the second pan, G, to the boiling-point is employed in warming the brine in the pan H; fifth, the impurities, instead of being deposited on a heated metallic surface and burned to it so as to be only removed with great difficulty, are deposited upon wood, from which they can be with facility removed; sixth, the process is continuous, the supply of brine to the several pans being constant, and the salt being removed from the pan by any suitable means while the boiling is in progress.

A pan to produce the same quantity of salt as a series of kettles, such as are commonly employed, may be constructed at about one-sixteenth ($\frac{1}{16}$) of the cost, and the boiling process may be conducted with a reduction of labor.

The same apparatus may be used for boiling either maple or cane sugar, and in that case the passage from one pan to the other may be made through flannel to filter it of all impurities before being boiled into sirup. Then the boiling and cleansing processes may progress together.

What I claim as my invention, and desire to secure by Letters Patent, is—

The employment, for boiling salt, or for any evaporating process of a similar nature, of a series of pans, F G H, arranged in communication with each other, and heated by a pipe or flue passing through them in succession, substantially as herein described, so as to heat the brine or other solution and cause the deposit of the impurities previously to its entering the pan in which the crystallization or final boiling takes place.

HENRY G. BULKLEY.

Witnesses:
L. SLATER,
FREDERICK W. WILLCOX.